May 11, 1937. W. M. COHN 2,079,900
METHOD OF TESTING MATERIALS
Filed Nov. 1, 1933
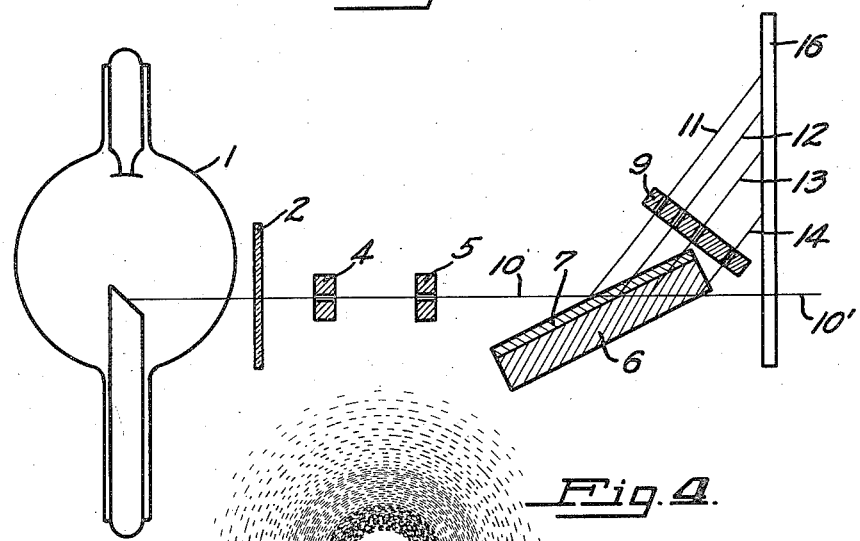
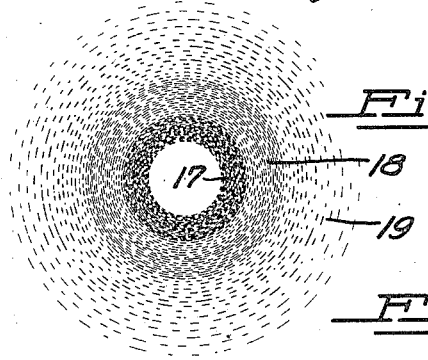
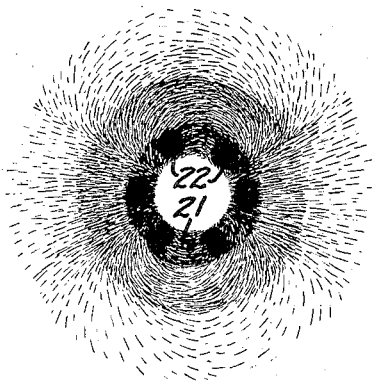
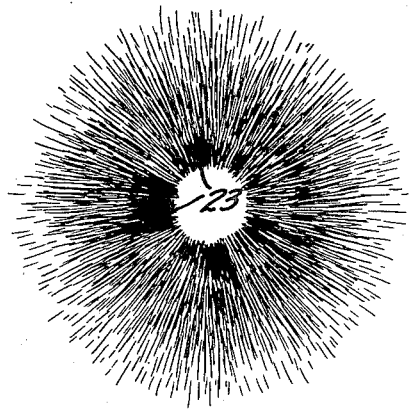
INVENTOR,
WILLI M. COHN.
BY
ATTORNEY Patented May 11, 1937

2,079,900

UNITED STATES PATENT OFFICE 2,079,900

METHOD OF TESTING MATERIALS

Willi M. Cohn, Berkeley, Calif.

Application November 1, 1933, Serial No. 696,218

3 Claims. (Cl. 250—34)

My invention relates to methods of testing materials, and particularly to methods of determining the resistance or susceptibility of metals to deterioration, such as corrosion, or "crystallization" and failure caused thereby.

Among the objects of my invention are: To provide a method of predetermining the resistance of a specific sample of material to corrosion without subjecting said sample to actual corrosive influences; to provide a method of determining the susceptibility of manufactured parts, which are to be operated under stress, to failures due to "crystallization"; to provide a method of determining whether metal be under internal strain at a level within said metal where deterioration is most likely to start; to provide a method of determining the degree of internal strain at any desired level within said metal; and, specifically, to provide a method of determining the resistance of tin plate or like material to corrosion or other destructive influences without destroying the sample tested.

Other objects of my invention will be apparent or will be specifically pointed out in the description forming a part of this specification, but I do not limit myself to the embodiment of the invention herein described, as various forms may be adopted within the scope of the claims.

It has long been known that metals and metal parts of various types, although apparently of identical chemical composition and subjected to manufacturing processes under apparently identical conditions, vary greatly in their resistance to deterioration. For example, samples of tin plate, originating in the same batch, may vary many fold in their reaction to corrosion tests under standard conditions, i. e., when subjected to dilute acid or salt solution under controlled temperature and other surrounding conditions, the loss of weight in a given time may vary by this factor.

Similarly, metal parts for oil or acid stills of apparently identical construction and weight, may differ enormously in the service given. One may last for years, and at the end of its service be apparently as strong as ever. Another, operated under identical conditions of service, may fail within a short time by fracture, and this fracture may often initiate from a curved interior surface of the part.

I have determined, from an extensive series of tests, that these anomalies can largely be explained on the basis of internal strain in the material. These tests have shown that it is the release of these strains, over, perhaps, an extended period of time, which forms the nuclei of disintegration, and that unstrained material will withstand corrosion and other deteriorative influences which would cause the complete destruction of similar materials which were originally under strain.

Broadly considered, the method of testing materials which I have invented comprises determining the degree of internal strain in the material under consideration, and evaluating the susceptibility to deterioration by comparison of the degree of strain with that of like material having known susceptibility thereto. My method further consists in forming X-ray diffraction patterns with the material to be tested and determining the susceptibility to corrosion from the nature of the pattern thus formed.

Referring to the drawing:

Figure 1 is a schematic diagram illustrating the method of obtaining X-ray diffraction patterns for determining the degree of internal strain in materials.

Figures 2, 3 and 4 are diffraction patterns of the types obtained from materials subjected respectively to average, heavy, and minimum internal strain.

A preferred method of carrying out the test is schematically illustrated in Figure 1. An X-ray tube 1 is excited so as to generate X-rays of a desired degree of penetration or "hardness". These rays are passed through a filter 2, to select a substantially monochromatic portion thereof, it usually being convenient, with standard apparatus, to choose rays of a wavelength corresponding to one of the lines in the "K" spectrum of tungsten. A single pencil of substantially parallel rays is obtained by passing them through a pair of aligned pin-hole apertures, usually formed in lead, these being symbolized by the elements designated by the reference characters 4 and 5. As the filtering and collimation of X-ray beams are well known processes, more elaborate description of this portion of the process is believed unnecessary.

The beam of rays thus generated and selected is directed at an oblique angle upon the test sample, which may be taken to represent a sheet of iron 6 coated with a layer of tin 7.

Upon reaching and entering the sample, the rays undergo a repeated series of partial reflections and diffraction. These processes occur at each layer within the material, but although the reflection is never complete, that from any desired layer may be selected by taking an angle of reflection equal to the angle of incidence, and selecting the rays reflected at that angle by means of an aperture, preferably annular, formed in a diaphragm 9 of lead or similar dense material. In the drawing the original principal ray is designated by the reference character 10, that portion of it passing through the entire sample being indicated by the character 10'. The ray 11 is that reflected from the supper surface of the tin coating. The ray 12 is reflected from the lower surface of the tin or the upper surface of the iron; the ray 13 is reflected from a level within the body of the iron, while the ray 14 is reflected from the lower surface of the iron. In this manner it is possible to select rays from any desired level within the sample by proper positioning of the apertures in the diaphragm 9. The diffraction patterns are preferably recorded upon the photographic plate 16, and it is from the nature of these patterns that the internal state of the sample may be ascertained, i. e., whether it be unstrained, subjected to a greater or less degree of strain, and the nature of the strain.

Three characteristic X-ray patterns are shown in Figures 2, 3, and 4 respectively. In making the exposures resulting in these figures it is desirable, although not necessary, to shield the plate from the central or principal ray, in order to prevent over-exposure and halation effects, and hence the central portion of each of the diagrams is white and substantially unexposed. Surrounding this central portion is a substantially circular figure. Where the material is without internal strain this figure takes the form of a number of zones or annuli 17, 18, and 19 of varying density. Each zone, upon careful examination will be found to consist of longer or shorter lines or dots, and where strain is absent the arrangement of these lines is uniform and almost entirely circumferential, e. g., as shown in Figure 4.

A commercial sample of fairly good characteristics will give a pattern more closely approximating that shown in Figure 2. This diagram also shows three clearly defined zones, but the interior and darker zone 21 is marked by a number (in this case 6) of spots 22 of greater density. The purely circumferential nature of the pattern structure is also disturbed, markedly radial components appearing, although the general appearance of the pattern is still primarily circumferential.

Patterns of this general nature may be expected from material which has been subjected to a certain amount of cold working, as such processes tend to give a marked degree of orientation to the crystals of the metal, and it is this orientation which gives the characteristic symmetrical arrangement of the dense areas 22.

Figure 3 shows the pattern produced by a badly stressed sample. It will be noted that the structure of the pattern is, in this case, almost entirely radial. While there is some suggestion of zoning in the structure, it is almost entirely masked by the strongly marked, radial dashes, and by the dense areas 23 which are not symmetrically positioned.

A pattern of the type of Figure 3 indicates a sample which is badly strained internally, the strains being of the type which are produced primarily by heat treatment and insufficient subsequent annealing.

Tests have shown that practically all samples will give patterns approximating one or the other of those shown in the figures. A sample giving a pattern similar to Figure 2 will show average or "commercial" resistance to corrosion or fatigue. Samples giving patterns like Figure 3 will be exceedingly susceptible to corrosion, while those giving patterns similar to Figure 4 will be exceptionally resistant thereto.

It might be thought that in the case of plated material, such as tin plate, only the condition of strain in the surface of the tin would be important, as it is known that electromotive forces may exist in the same material as between strained and unstrained portions. I have found, however, that the condition of the underlying iron is equally likely to cause deteriorative action as is the surface layer. Although I do not limit myself to the theory, there is much evidence to indicate that strains such as give rise to the pattern shown in Figure 3 relieve themselves gradually, and that in so doing the bond between the underlying metal and the tin coating is ruptured, even if only microscopically. In this manner nuclei are formed at which corrosion may set in, and once the process has started it accelerates rapidly, thus leading to destruction of the material.

The same causes as lead to corrosion in tin plate also contribute to failures of the type which are classed as "crystallization". I have found, for example, that it is possible to predetermine the probable life of metal coils in oil stills by means of a technique similar to that just described. I have found, moreover, that the source of failures of this character is usually the internal surface of these coils, and that this portion of the material may be under severe strain while the outer surface is not. It will therefore be seen that the method of my invention offers peculiar advantages in making tests of this type of apparatus, since it not only permits the equipment which is to be placed in actual use to be tested without injuring or destroying it, but also permits a test being made at known levels below the surface, and particularly at the levels where deterioration is most likely to start.

One other type of deterioration which may be predetermined by the method of my invention is worthy of note. Certain metals, when coated with vitreous enamels, are subject to "blistering", while others are not. In those metals which do blister, the bond between the enamel and the metal is impaired, moisture or other destructive agencies gain access to the metal, and corrosion sets in.

I have found that this effect also is due to strains in the metal, and that the same type of tests which are used to predetermine deterioration in tin plate will also predetermine the tendency to blister in enameled metal.

I claim:

1. The method of predetermining the resistance to corrosion of an underlying metal having a protective coating which comprises the steps of directing a pencil of X-rays obliquely against said metal through said coating, segregating from the reflected rays those reflected from the portion of the underlying metal adjacent the coated surface, and obtaining a diffraction pattern from the segregated rays.

2. The method of obtaining X-ray diffraction patterns from known depths below the surface of a material to be tested which comprises the steps of forming a collimated beam of X-rays, directing said rays obliquely against the portion to be tested of said material, positioning an aperture to select reflected radiation proceeding from said material along a line intersecting said collimated beam at the required depth below the surface, and translating the diffraction pattern formed by the selected rays into a visible image.

3. The method of determining the degree to which a metallic coating adherent to an underlying metal of different characteristics will prevent corrosion of the latter which includes the steps of directing a collimated beam of X-rays through said coating obliquely against said underlying metal, selecting from rays reflected from coating and metal those reflected from a plane of said metal adjacent said coating, and causing the selected rays to define a diffraction pattern indicative of the degree to which the metal in said plane is stressed.

WILLI M. COHN.